US012760642B2

(12) United States Patent
Teerlink et al.

(10) Patent No.: US 12,760,642 B2
(45) Date of Patent: Oct. 13, 2026

(54) METHOD FOR DETERMINING GEOLOGY WHILE DRILLING

(71) Applicant: Royal Eijkelkamp B.V., Giesbeek (NL)

(72) Inventors: Thijs Teerlink, Arnhem (NL); Hugo Jaap Eijkelkamp, Giesbeek (NL)

(73) Assignee: Royal Eijkelkamp B.V., Giesbeek (NL)

( * ) Notice: Subject to any disclaimer, the term of this patent is extended or adjusted under 35 U.S.C. 154(b) by 0 days.

(21) Appl. No.: 18/994,175

(22) PCT Filed: Jun. 9, 2023

(86) PCT No.: PCT/EP2023/065464
§ 371 (c)(1),
(2) Date: Jan. 14, 2025

(87) PCT Pub. No.: WO2024/012777
PCT Pub. Date: Jan. 18, 2024

(65) Prior Publication Data

US 2025/0305414 A1 Oct. 2, 2025

(30) Foreign Application Priority Data

Jul. 15, 2022 (EP) .................................... 22185155

(51) Int. Cl.
*E21B 49/00* (2006.01)
*E21B 7/24* (2006.01)
*G01V 1/48* (2006.01)

(52) U.S. Cl.
CPC .............. *E21B 49/003* (2013.01); *E21B 7/24* (2013.01); *G01V 1/48* (2013.01); *G01V 2200/16* (2013.01);

(Continued)

(58) Field of Classification Search
CPC ....... E21B 49/00; E21B 49/003; E21B 49/005
See application file for complete search history.

(56) References Cited

U.S. PATENT DOCUMENTS 5,540,295 A * 7/1996 Serrette ..................... E21B 1/02 74/61
6,374,185 B1 * 4/2002 Taner ....................... G01V 1/40 702/14

(Continued)

FOREIGN PATENT DOCUMENTS

CN 101575970 A 11/2009

*Primary Examiner* — Kristyn A Hall
(74) *Attorney, Agent, or Firm* — The Webb Law Firm

(57) ABSTRACT

A method for determining the geology at a geographical location while drilling is disclosed, which method includes the steps of:

performing sonic drilling with a drill pipe, a sonic drilling head, wherein the drill pipe is coupled to the sonic drilling head and wherein the sonic drilling head has vibration means for vibrating the drill pipe;

measuring the vibrations of the drill pipe during drilling;

converting the measured vibrations from the time domain to the frequency domain by applying a Fourier transformation; and determining the soil composition at the momentary drill depth by comparing the frequency pattern from the Fourier transformation with predefined frequency patterns for different soil compositions.

3 Claims, 3 Drawing Sheets

(52) U.S. Cl.
CPC .. *G01V 2210/1216* (2013.01); *G01V 2210/40* (2013.01)

(56) References Cited

U.S. PATENT DOCUMENTS

| | | | | |
|---|---|---|---|---|
| 10,697,294 | B2 | 6/2020 | Palmer et al. | |
| 2007/0151377 | A1* | 7/2007 | Roussy | E21B 7/24 74/87 |
| 2010/0101863 | A1* | 4/2010 | Oothoudt | E21B 7/24 175/323 |
| 2011/0056750 | A1 | 3/2011 | Lucon | |
| 2016/0069182 | A1 | 3/2016 | Neale et al. | |
| 2017/0342808 | A1* | 11/2017 | Dykstra | E21B 44/06 |
| 2018/0142437 | A1* | 5/2018 | Powers, III | E04B 1/24 |
| 2019/0257197 | A1* | 8/2019 | Palmer | E21B 49/005 |
| 2022/0065045 | A1* | 3/2022 | Knolle | E21B 7/02 |

* cited by examiner

METHOD FOR DETERMINING GEOLOGY WHILE DRILLING

CROSS-REFERENCE TO RELATED APPLICATIONS

This application is the United States national phase of International Patent Application No. PCT/EP2023/065464 filed Jun. 9, 2023, and claims priority to European Patent Application No. 22185155.3 filed Jul. 15, 2022, the disclosures of which are hereby incorporated by reference in their entireties.

BACKGROUND OF THE INVENTION

Field of the Invention

The invention relates to a method for determining the geology at a geographical location while drilling.

Description of Related Art

When drilling holes into the ground it is beneficial to know the geology as the drilling parameters, such as drill force, drill speed, and drill tool can be adjusted to optimize the drill process. For example, when a rock layer is present at a certain depth, the drill force could for example be reduced to prevent excessive wear of the drill tool. On the other hand, when a hole is drilled in sand-like layers, a high drill speed could be applied.

In order to know the geology before drilling a hole, one could send from the surface sound waves and detect the reflection of the sound waves to determine the geology.

Another options is to use cone penetration testing, in which a cone is pushed by a rod into the ground and the force and speed with which the cone advances into the ground is an indication for the geology at said geographical location.

If however a large number of holes need to be drilled over a large area, then a single cone penetration test is not sufficient to optimize the drilling for all of said holes.

SUMMARY OF THE INVENTION

It is an object of the invention to reduce or even remove the above mentioned disadvantages.

This object is achieved according to an embodiment of the invention with a method for determining the geology at a geographical location while drilling, which method comprises the steps of:

- performing sonic drilling with a drill pipe, a sonic drilling head, wherein the drill pipe is coupled to the sonic drilling head and wherein the sonic drilling head has vibration means for vibrating the drill pipe;
- measuring the vibrations of the drill pipe during drilling;
- converting the measured vibrations from the time domain to the frequency domain by applying a Fourier transformation; and
- determining the soil composition at the momentary drill depth by comparing the frequency pattern from the Fourier transformation with predefined frequency patterns for different soil compositions.

Sonic drilling is a technique that significantly reduces friction on the drill string and drill bit by using energy resonance to affect the soil structure where it contacts the drill string. This combination makes penetrating for a large range of soils much easier.

Typically, the resonate energy is generated inside the sonic head with two counter-rotating weights called eccentrics. One turns clockwise, and one turns counterclockwise, with both weights moving up to 9,000 revolutions per minute.

According to an embodiment of the invention the response of the drill pipe to the resonate energy caused by the vibration means in combination with the soil composition is recorded by measuring the vibrations of the drill pipe.

The measured vibrations are then converter from the time domain to the frequency domain by applying a Fourier transformation, such that the vibrations are no longer time dependent. This results in clear distinguishable frequency pattern, which is indicative for the soil composition at which the drill pipe is currently drilling.

Comparing this frequency pattern from the Fourier transformation with predefined frequency patterns for different soil compositions allows the drill operator to know the soil composition at the momentary drill depth.

A preferred embodiment of the method according to the invention further comprises the step of:

- adjusting the drilling parameters, such as drill force, drill speed, and the frequency of the vibrations with which the drill pipe is vibrated, based on the determined soil composition for the momentary drill depth.

Because the drill operator knows the soil composition at the momentary drill depth, the drill operator can easily adjust the drilling parameters to ensure optimal drilling. The method of the invention provides for a quicker feed back, which requires less experience of the drill operator.

In addition the drilling parameters could also be further adjusted based on other measurements from the time domain.

Yet another embodiment of the method according to the invention further comprises the step of:

- combining the determined soil compositions at the plurality of momentary drill depths to compose the geology at the geographical location.

Using the determined soil compositions at the plurality of momentary drill depths, the geology of said geographical location is easily composed. If holes need to be drilled close by, then the geology could also be used by drill rigs and operators, which do not apply the method according to the invention. Or, the geology could be used to determine to which depth a tube needs to be inserted for example for use of thermal energy.

In yet another preferred embodiment of the method according to the invention for comparing of the frequency pattern from the Fourier transformation with predefined frequency patterns for different soil compositions a probabilistic, or fuzzy, matching algorithm is used.

In probabilistic matching, several field values are compared between two records and each field is assigned a weight that indicates how closely the two field values match. The sum of the individual fields weights indicates the likelihood of a match between two records.

This allows for matching the pattern of the converted measured vibrations with the predefined frequency patterns for different soil compositions without needing an exact match. If patterns are very similar, a match is already confirmed and the soil composition can be determined.

In yet a further preferred embodiment of the method according to the invention the predefined frequency patterns are defined by repeating a plurality of times the following steps at different geographic locations:

- performing sonic sample drilling with a hollow drill pipe, a sonic drilling head, wherein the drill pipe is coupled to the sonic drilling head and wherein the sonic drilling head has vibration means for vibrating the drill pipe;

measuring the vibrations of the drill pipe during drilling;

converting the measured vibrations from the time domain to the frequency domain by applying a Fourier transformation;

storing the frequency pattern from the Fourier transformation for the specific drilling depth;

after reaching an end depth, retracting the hollow drill pipe;

examining the sample contained in the hollow drill pipe for the soil composition along the length of the sample;

matching the soil composition at a position along the length of the sample with the stored frequency pattern for a specific drilling depth to compose a predefined frequency pattern for the soil composition.

With this embodiment soil samples are retrieved from different geographical locations and therefore from different geologies. By recording the converted measured vibrations for each specific drilling depth, the soil composition corresponding to the frequency pattern can be determined after the sample is retrieved from the hollow drill pipe.

As a result a large dataset can be obtained for the predefined frequency patterns, which increases the accuracy of the method according to the invention.

BRIEF DESCRIPTION OF THE DRAWINGS

These and other features of the invention will be elucidated in conjunctions with the accompanying drawings.

FIG. 1 shows a cross-section of the geology at a specific geographic location. A sonic drill rig 1 is positioned on the surface 2. The sonic drill rig 1 has sonic drilling head 3 and a drill pipe 4.

DESCRIPTION OF PREFERRED EMBODIMENTS

When drilling a hole into the ground, the drill pipe 4 has passed a number of distinctive ground layers A, B, C. Typically sonic drilling is performed with a constant speed of the drill pipe 4 into the ground and as a result the depth and time are linked in this example. The measured vibrations of the drill pipe 4 are shown in the diagram 5. The time t and the depth d linked therewith are shown on the X-axis, while the frequency f of the vibrations is shown on the Y-axis.

In the diagram 5 the vibrations for the distinctive ground layers A, B, C are clearly visible.

Figure 1:
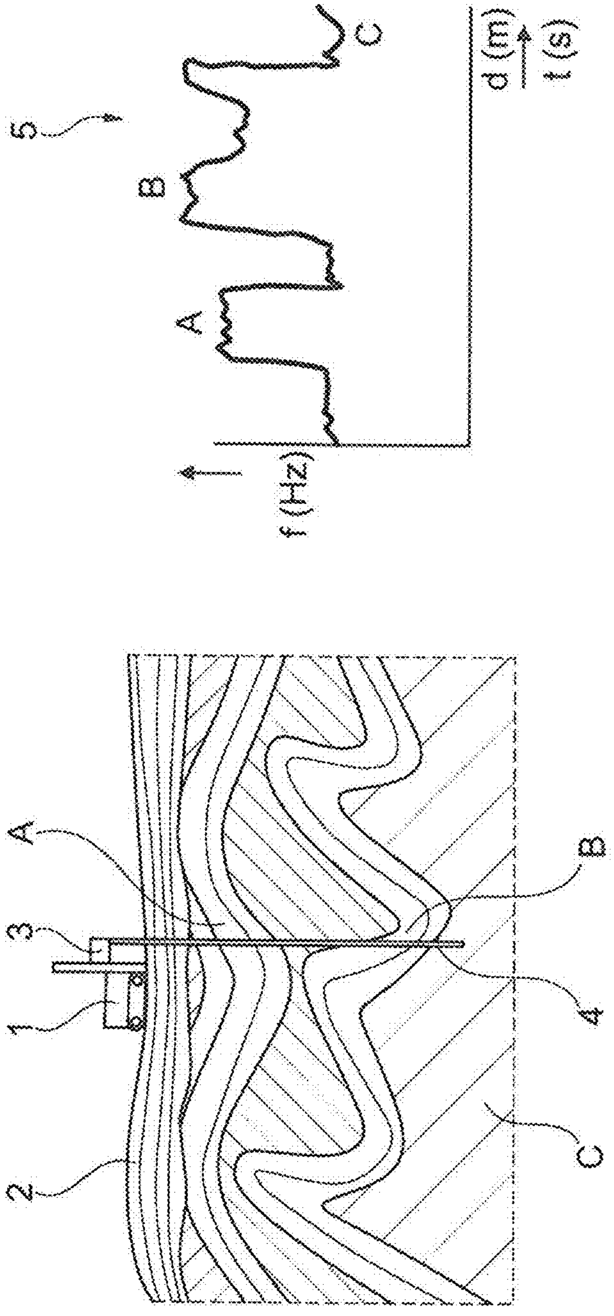
FIG. 1 shows schematically the steps of the sonic drilling into the ground and the registration of the vibrations of the drilling pipe of an embodiment of the invention.
Figure 2:
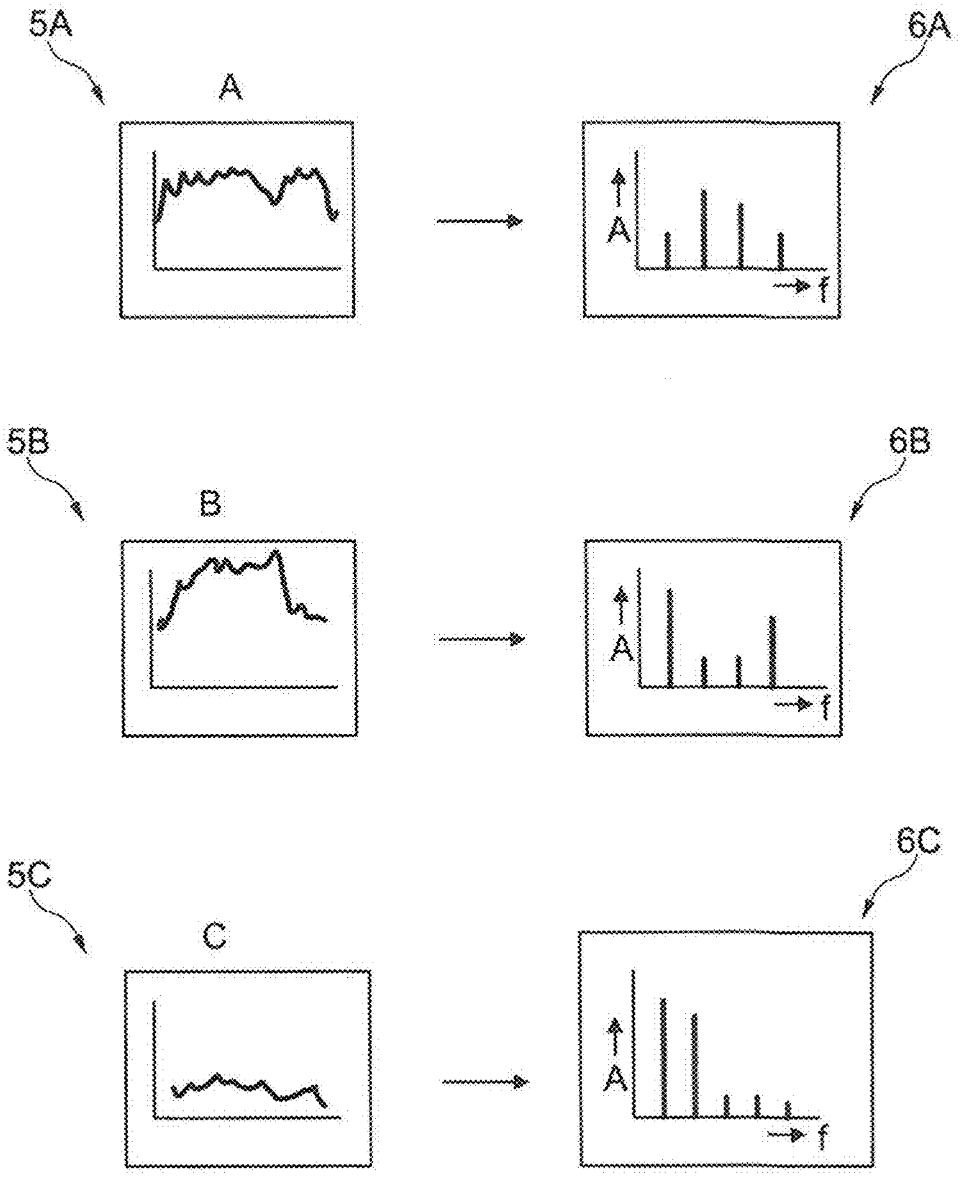
FIG. 2 shows the further step of conversion of the vibrations from the time domain into the frequency domain.

FIG. 2 shows schematically the step of converting the measured vibrations for each distinctive ground layers A, B, C from the time domain 5A, 5B, 5C to the frequency domain 6A, 6B, 6C by applying a Fourier transformation. Each frequency domain diagram 6A, 6B, 6C shows on the X-axis the frequency f and on the Y-axis the amplitude A.

The frequency domain diagram 6A, 6B, 6C show a clear pattern of characteristic frequencies and amplitudes, which characterize the soil composition for a specific layer in the geology.

Figure 3:
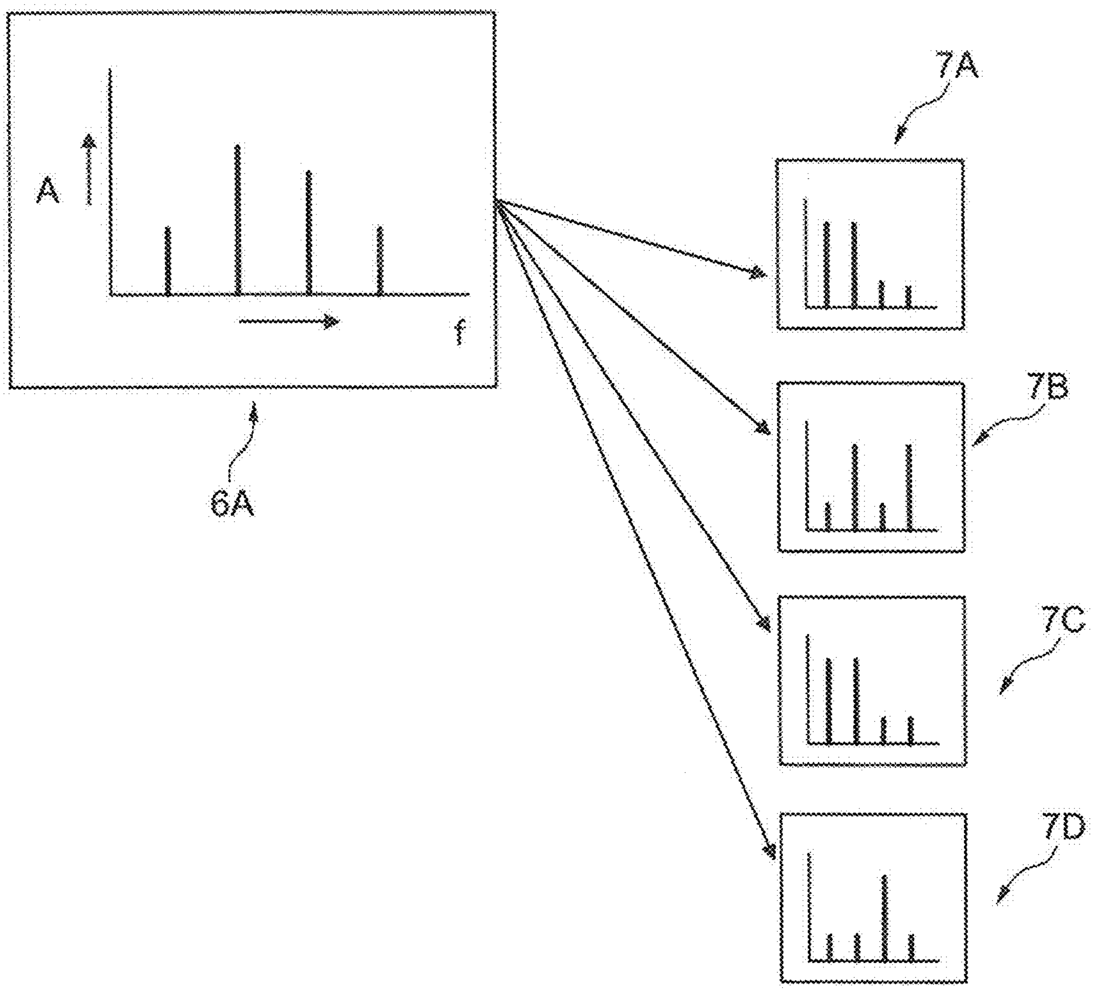
FIG. 3 shows the step of comparing the converted frequency pattern with predefined frequency patterns.

These frequency patterns 6A, 6B, 6C are then compared with predefined frequency patterns 7A, 7B, 7C, 7D (see FIG. 3) There is a clear match between the measured and converted frequency pattern 6A and the predefined frequency pattern 7C. The predefined frequency pattern 7C is for example characteristic for a lime soil composition. This allows the drill rig operator to adjust any drilling parameters based on determined geology at which the drill pipe is currently drilling.

The predefined frequency patterns 7A-7D are obtained with the similar method as described above. Instead of comparing the converted measured frequencies to a predefined pattern, the real sample of the soil composition is examined to link the converted measured frequency pattern with the actual soil composition, such that such a pattern can be used as a predefined frequency pattern.

By repeating this for a number of geographic locations, where the geology differs, the amount of data for the predefined frequency patterns is increased, which improves the accuracy for the matching of measured frequencies during drilling with the predefined frequency patterns.

The invention claimed is:

1. A method for determining a geology at a geographical location while sonic drilling, which method comprises the steps of:

performing sonic drilling into a ground surface at the geographical location with a sonic drill rig, wherein the sonic drill rig comprises a sonic drilling head and a drill pipe coupled to the sonic drilling head, and wherein the sonic drilling head has two counter-rotating weights for vibrating the drill pipe during sonic drilling;

measuring the vibrations of the drill pipe during sonic drilling;

converting the measured vibrations from the time domain to the frequency domain by applying a Fourier transformation;

determining a soil composition at a momentary drill depth by comparing the frequency pattern from the Fourier transformation with predefined frequency patterns for different soil compositions, and adjusting sonic drilling parameters at the momentary drill depth based on the determined soil composition for the momentary drill depth, wherein the sonic drilling parameters comprise drill force, drill speed, and the frequency of the vibrations with which the drill pipe is vibrated, wherein the predefined frequency patterns are defined by repeating a plurality of times the following steps at different geographic locations:

performing sonic sample drilling with a hollow drill pipe, a sonic drilling head, wherein the drill pipe is coupled to the sonic drilling head and wherein the sonic drilling has vibration means two counter-rotating weights for vibrating the drill pipe;

measuring the vibrations of the drill pipe during sonic sample drilling;

converting the measured vibrations from the time domain to the frequency domain by applying a Fourier transformation;

storing the frequency pattern from the Fourier transformation for the specific drilling depth;

after reaching an end depth, retracting the hollow drill pipe;

examining a sample contained in the hollow drill pipe for the soil composition along the length of the sample;

matching the soil composition at a position along the length of the sample with the stored frequency pattern for a specific drilling depth to compose a predefined frequency pattern for the soil composition.

2. The method according to claim 1, further comprising the step of:

combining the determined soil compositions at a plurality of momentary drill depths to compose the geology at the geographical location.

3. The method according to claim 1, wherein for comparing of the frequency pattern from the Fourier transformation with predefined frequency patterns for different soil compositions a probabilistic, or fuzzy, matching algorithm is used.

* * * * *